United States Patent
Madan et al.

(10) Patent No.: US 11,570,174 B2
(45) Date of Patent: Jan. 31, 2023

(54) AUDIO SIGNAL BASED IDENTIFICATION

(71) Applicant: Google LLC, Mountain View, CA (US)

(72) Inventors: Arjita Madan, Nellore Andhra Pradesh (IN); Sumit Gwalani, Maharashtra (IN)

(73) Assignee: GOOGLE LLC, Mountain View, CA (US)

( * ) Notice: Subject to any disclaimer, the term of this patent is extended or adjusted under 35 U.S.C. 154(b) by 117 days.

(21) Appl. No.: 16/645,310

(22) PCT Filed: Jun. 8, 2018

(86) PCT No.: PCT/US2018/036788
§ 371 (c)(1),
(2) Date: Mar. 6, 2020

(87) PCT Pub. No.: WO2019/050583
PCT Pub. Date: Mar. 14, 2019

(65) Prior Publication Data
US 2021/0029122 A1  Jan. 28, 2021

Related U.S. Application Data

(60) Provisional application No. 62/554,829, filed on Sep. 6, 2017.

(51) Int. Cl.
*G06F 15/16* (2006.01)
*H04L 9/40* (2022.01)
(Continued)

(52) U.S. Cl.
CPC ......... *H04L 63/10* (2013.01); *G06Q 20/3221* (2013.01); *H04L 67/303* (2013.01);
(Continued)

(58) Field of Classification Search
CPC ..... G06Q 20/3221; H04L 63/10; H04L 63/18; H04L 67/303; H04L 67/306; H04W 12/08; H04W 4/02; H04W 76/14; H04W 8/22
See application file for complete search history.

(56) References Cited

U.S. PATENT DOCUMENTS

2010/0099356 A1  4/2010  Forrest
2011/0314153 A1* 12/2011  Bathiche ............... H04L 67/16
                                                                  709/225
(Continued)

FOREIGN PATENT DOCUMENTS

CN    102255896    11/2011
CN    102693149     9/2012
(Continued)

OTHER PUBLICATIONS

Agadakos et al, "Location-Enhanced Authentication using the IoT", Annual Computer Security Applications Conference, Dec. 5-9, 2016, Los Angeles, California, 14 pages.
(Continued)

*Primary Examiner* — Normin Abedin
(74) *Attorney, Agent, or Firm* — Dority & Manning, P.A.

(57) ABSTRACT

Controlling wireless access to target devices by initiating, by a user device, wireless pairing with a target device. The user device collects, concurrent with the initiating, a wireless signal of at least the target device. One or more computing devices builds a profile for the user device based on the collected wireless signal. The one or more computing devices controls access of the user device to functionality of the target device based on the profile.

17 Claims, 4 Drawing Sheets

(51) Int. Cl.
  *H04W 76/14* (2018.01)
  *G06Q 20/32* (2012.01)
  *H04L 67/303* (2022.01)
  *H04W 4/02* (2018.01)
  *H04W 12/08* (2021.01)
(52) U.S. Cl.
  CPC ............ *H04W 4/02* (2013.01); *H04W 12/08* (2013.01); *H04W 76/14* (2018.02)

(56) References Cited

U.S. PATENT DOCUMENTS

| | | | | |
|---|---|---|---|---|
| 2013/0024916 | A1* | 1/2013 | Evans | .................... G06Q 30/06 |
| | | | | 726/5 |
| 2015/0088739 | A1* | 3/2015 | Desai | ................. G06Q 30/0631 |
| | | | | 705/42 |
| 2015/0381633 | A1 | 12/2015 | Grim et al. | |
| 2017/0185980 | A1* | 6/2017 | Wurmfeld | ............. G07F 19/202 |
| 2018/0068297 | A1* | 3/2018 | Goodman | ............. G06Q 20/32 |

FOREIGN PATENT DOCUMENTS

| | | |
|---|---|---|
| CN | 106470207 | 3/2017 |
| WO | WO0190843 | 9/2020 |

OTHER PUBLICATIONS

International Search Report and Written Opinion for PCT/US2018/036788, dated Sep. 19, 2018, 2 pages.

Prak et al, "Leveraging Cellular Infrastructure to Improve Fraud Prevention", Annual Computer Security Applications Conference, Dec. 7-11, 2009, Honolulu, Hawaii, 10 pages.

* cited by examiner

200

```
┌─────────────────────────────────────────────────────────────────────┐
│  Initiate, by a user device, wireless pairing with a target device  │
│                                 210                                 │
└─────────────────────────────────────────────────────────────────────┘
                                    │
                                    ▼
┌─────────────────────────────────────────────────────────────────────┐
│ Collect, by the user device and concurrent with the initiating, a   │
│            wireless signal of at least the target device            │
│                                 220                                 │
└─────────────────────────────────────────────────────────────────────┘
                                    │
                                    ▼
┌─────────────────────────────────────────────────────────────────────┐
│ Build, by one or more computing devices, a risk profile for the     │
│         user device based on the collected wireless signals;        │
│                                 240                                 │
└─────────────────────────────────────────────────────────────────────┘
                                    │
                                    ▼
┌─────────────────────────────────────────────────────────────────────┐
│ Control, by the one or more computing devices, access of the user   │
│     device to functionality of the target device based on the       │
│                               profile                               │
│                                 250                                 │
└─────────────────────────────────────────────────────────────────────┘
```

FIG. 2

AUDIO SIGNAL BASED IDENTIFICATION

CROSS REFERENCE TO RELATED APPLICATIONS

This application is based upon and claims the right of priority under 35 U.S.C. § 371 to International Application No. PCT/US2018/036788 filed on Jun. 8, 2018, which claims the benefit of U.S. Provisional Patent Application No. 62/554,829, filed Sep. 6, 2017 and entitled "Audio Signal Based identification." Applicant claims priority to and the benefit of each of such applications and incorporates all such applications herein by reference in their entirety.

TECHNICAL FIELD

The technology disclosed herein is related to identification using audio signals collected by user devices. Particular embodiments relate to managing access to functionality based on such audio signals collected via mobile devices.

BACKGROUND

Identity and access management (IAM) involves controlling access to resources (including e.g., computing resources and physical spaces), including access to functions of those resources. IAM addresses the need to ensure appropriate access to resources across increasingly heterogeneous technology environments and to meet increasingly rigorous compliance requirements.

As of 2016, only thirteen percent of the U.S. adult population does not have a mobile phone. In most places outside the U.S., especially jurisdictions where a landline telecommunications infrastructure was not ubiquitous, more people have mobile phones than have access to landline phones. For example, India has vast non-banking population, many of whom reside in the rural areas and are cut off from access to basic financial services from a trusted source. However, as of 2012, India had nearly a billion mobile phone customers, many of whom access financial services via their mobile phones.

Throughout the world, mobile computing devices are being used to access functions and services, such as financial services. IAM directed to such access via mobile computing devices is an important aspect of offering such services.

SUMMARY

The technology described herein includes computer-implemented methods, computer program products, and systems to control wireless access to target devices. In some examples, a user device initiates wireless pairing with a target device. The user device collects, concurrent with the initiating, a wireless signal of at least the target device. One or more computing devices, build a profile for the user device based on the collected wireless signals. The one or more computing devices control access of the user device to functionality of the target device based on the profile.

In some such examples, the collected signal of a least the target device is an audio frequency signal. In some such examples, collecting further includes collecting, by the user device and concurrent with the initiating, audio outside the bandwidth of the wireless signal of the target device. In some such examples, collecting includes collecting a plurality of signals in the frequency band of the wireless signal of the target device.

In some such examples, the user device determines, concurrent with the initiating, the location of the first user device, and the profile is built further based in the determined location. In some such examples, controlling access includes basing a level of authentication required from the user device on the profile. In some such examples, the profile is built further based on one or more of the frequency of pairings between the user device and the target device, the rate of transactions completed after pairing between the user device and the target device, and the time of the pairing initiation.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 2 is a block diagram illustrating methods to control wireless access to target devices, in accordance with certain example embodiments.

DETAILED DESCRIPTION OF THE EXAMPLE EMBODIMENTS

In many cases, an organization (such as an enterprise or service provider) may have the need to monitor the risk profile of its members (employees or users) for access to certain services, benefits, or functionality. Audio pairing can be use to connect nearby devices such as mobile phones—for example to complete a transaction or exchange information between devices. During this pairing, the devices also may share their location information with the server (if online). If sufficient number of devices exist in the environment, which broadcast and receive audio signals, then a footprint of the user can be obtained based on the audio devices that the user interacted with over a certain period.

The data collected is used to build a risk profile of each user based on factors such as the frequency of pairing, location, authenticity of pairing (for example, does pairing end in a genuine transaction). This approach can be used to modify allowed behavior (for example, prevent too many payment requests from a suspected spammer). The approach is relevant for enterprise applications, allowing an administrator to set rules related to the pairing interactions between enabled users. In an enterprise context, it is possible to control the environment sufficiently to achieve the scenario described in the collection of signals section (for example, there are plenty of devices placed at various locations which emit and receive audio, and there are use cases for users to pair their devices with others).

Embodiments of the present technology include methods, systems, and computer program products control wireless access to target devices, for example by identifying user devices using audio signals.

Example System Architectures

Figure 1:
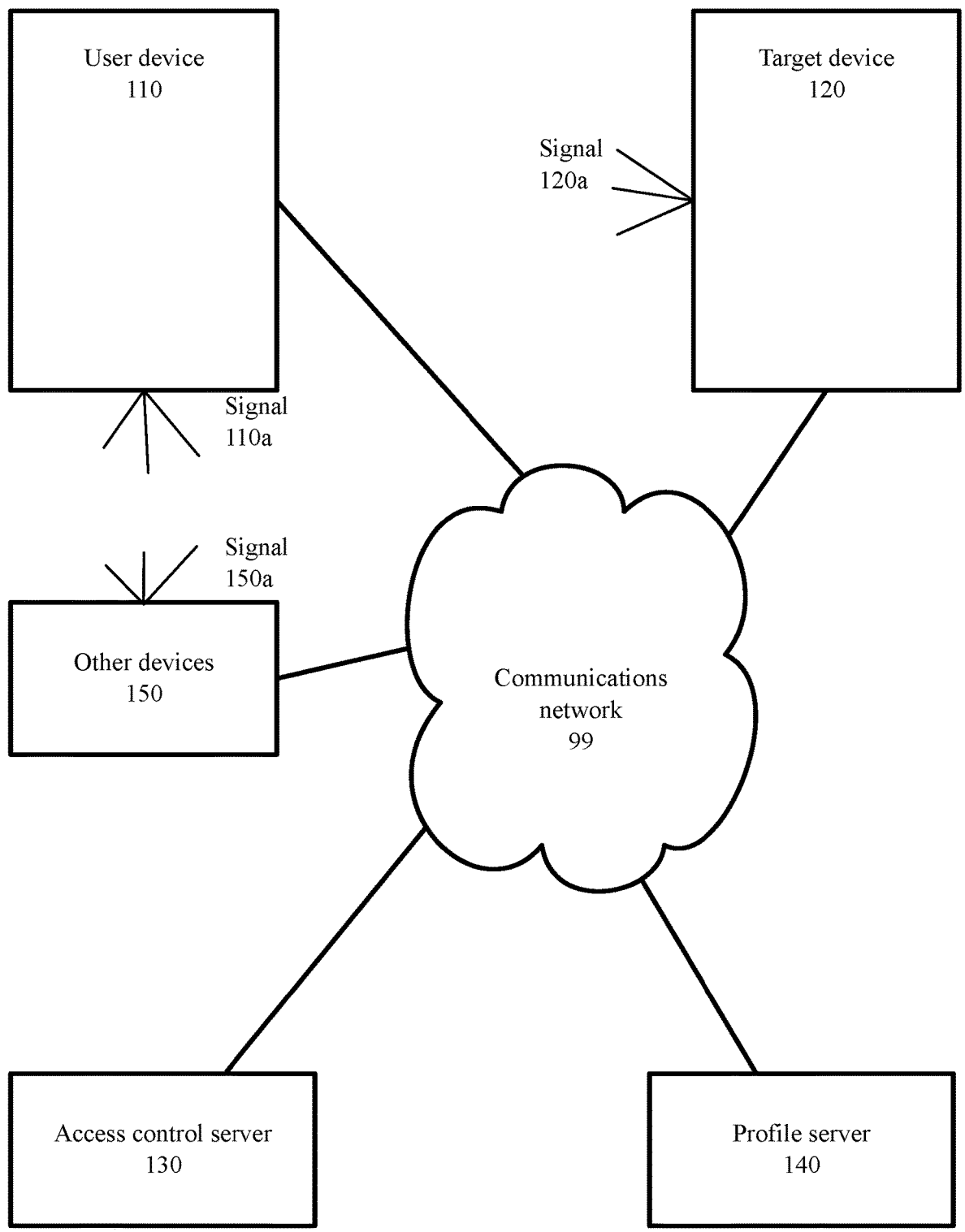
FIG. 1 is a block diagram depicting an operating environment to control wireless access to target devices, in accordance with certain example embodiments.

FIG. 1 is a block diagram depicting a communications and processing operating environment 100 in accordance with certain example embodiments. While each server, system, and device shown in the architecture is represented by one instance of the server, system, or device, multiple instances of each can be used. Further, while certain aspects of operation of the present technology are presented in examples related to FIG. 1 to facilitate enablement of the claimed invention, additional features of the present technology, also facilitating enablement of the claimed invention, are disclosed elsewhere herein.

As depicted in FIG. 1, the example operating environment 100 includes network devices 110, 120, 130, 140, and 150; each of which may be configured to communicate with one another via communications network 99. In some embodiments, a user associated with a device must install an application and/or make a feature selection to obtain the benefits of the technology described herein.

Network 99 includes one or more wired or wireless telecommunications means by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system, that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device 110, 120, 130, 140, and 150, can include a communication module capable of transmitting and receiving data over the network 99. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device.

User device 110 can be any user device, such as a mobile phone. User device 110 can receive signals, such as signal 120a and signal 150a, from devices within signal range of the user device, such as target device 120 and other devices 150. Target device 120 can be a device similar to user device 110, for example a mobile phone to be used for peer-to-peer payments between user device 110 and target device 120. As another example, target device 120 can be an automated teller machine (ATM) or an information kiosk with which the user device 110 can establish a local communication channel. Other devices 150 can be any device that emits signal 150a. Signal 150 can be energy, such as radio frequency electromagnetic energy or audio energy, compatible with the receiving abilities of user device 110. In general, user device 110, target device 120, and any one or more of zero or more other devices are within a local range of each other, where "local" means the range of signals 110a, 120a, and 150a.

Profile server 140 can be operated by a financial services company, or, as further example, by a company offering access control services to a financial services company. Access control server 130 can be operated by the financial services company to control access to functions (such as peer-to-peer payments between user device 110 and user device 120) offered by a function server 150 of the financial services company. Control of such access can be based on audio data collected by user devices 110, 120, and 150 based on profiles stored in profile server 140.

The network connections illustrated are examples and other means of establishing a communications link between the computers and devices can be used. Moreover, those having ordinary skill in the art having the benefit of the present disclosure will appreciate that the network devices illustrated in FIG. 1 may have any of several other suitable computer system configurations. For example, computing devices 110 and 120 each may be embodied as a mobile phone or handheld computer and may not include all the components described above.

Figure 4:
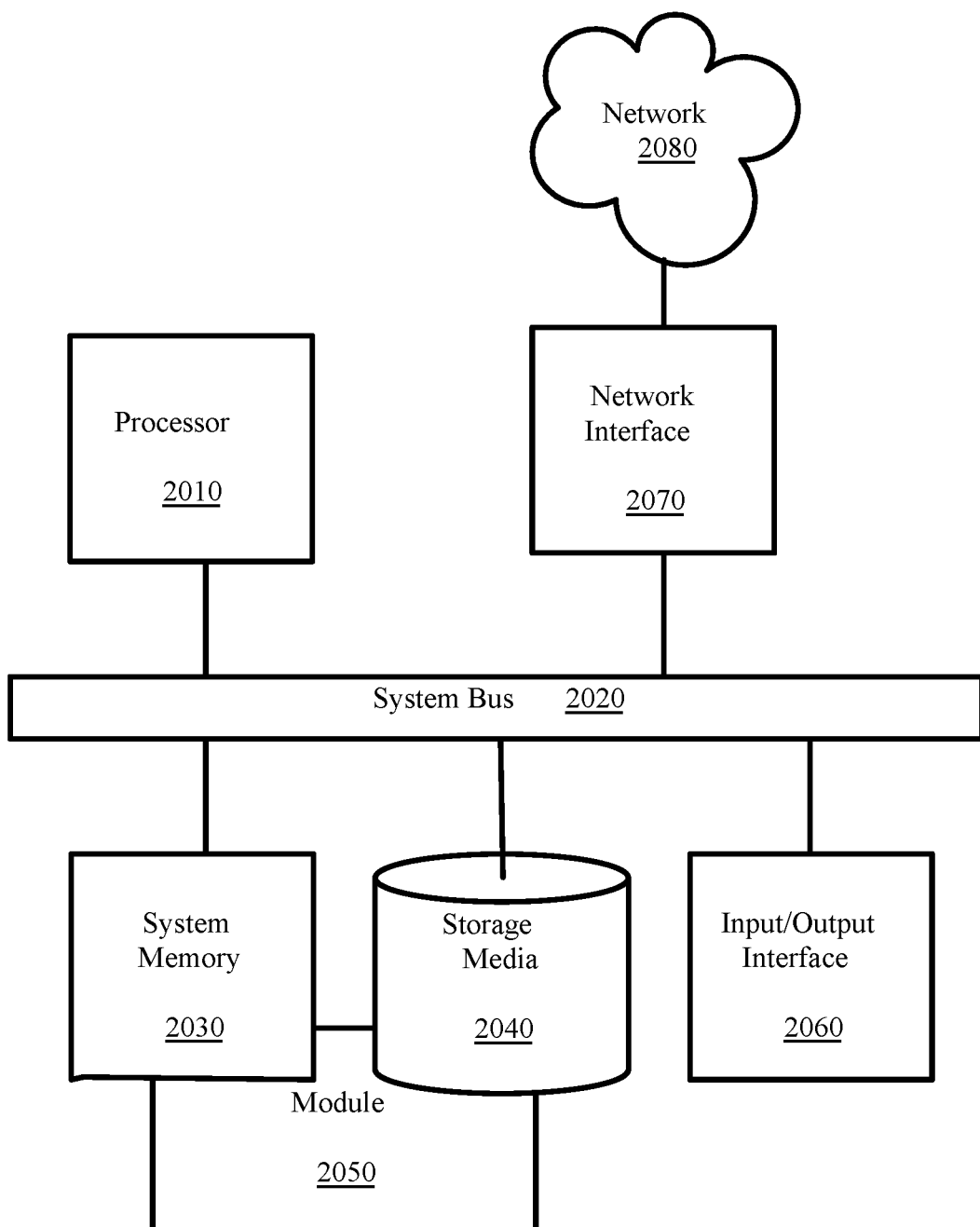
FIG. 4 is a block diagram depicting a computing machine and a module, in accordance with certain example embodiments.

In example embodiments, the network computing devices, and any other computing machines associated with the technology presented herein, may be any type of computing machine such as, but not limited to, those discussed in more detail with respect to FIG. 4. Furthermore, any modules associated with any of these computing machines, such as modules described herein or any other modules (scripts, web content, software, firmware, or hardware) associated with the technology presented herein may be any of the modules discussed in more detail with respect to FIG. 4. The computing machines discussed herein may communicate with one another as well as other computer machines or communication systems over one or more networks, such as network 99. The network 99 may include any type of data or communications network, including any of the network technology discussed with respect to FIG. 4.

Example Processes

The example methods illustrated in the figures are described hereinafter with respect to the components of the example operating environment 100. The example methods also can be performed with other systems and in other environments. The operations described with respect to any of the figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Referring to FIG. 2, and continuing to refer to FIG. 1 for context, methods 200 to identify user devices using audio signals are illustrated in accordance with certain example embodiments.

In such methods 200, a user device 110 initiates wireless pairing with a target device 120—Block 210. In a continuing example, the user device 110 is a mobile phone, and the target device is a particular automatic teller machine (ATM) in a set of two side-by-side ATMs. The user device 110 and the target device ATM 120 have pair multiple times over a month via an audio channel between the user device 110 and the particular ATM 120. The user device 110 use an audio signal to pair with an audio signal broadcast from the target device 120. In some embodiments, the pairing signals are radio frequency signals, such as BLUETOOH® signals, or other local, near-me, personal, body, of near-field network signals.

In such methods 200, a user device 110 collects wireless signals, concurrent with initiating, of at least the target device 120—Block 220. In a continuing example, the user device 110 (a mobile phone) and a particular automatic teller machine (ATM) 120 in a set of two side-by-side ATMs (the other being other device 150) have paired multiple times over a month via an audio channel between the first device and the particular ATM. The user device 110 repeatedly collected not only the broadcast of the particular ATM 120, but also collected the broadcast of the nearby ATM 150. In the continuing example, the user device 110 collects signals of both ATMs 120 and 150 concurrent with the initiated pairing of Block 210. In other example, the user device 110 collects only the audio frequency pairing signal of ATM 120. In yet other examples, the user device 110 collects audio signals from other, possibly indeterminate sources in the vicinity. In some examples, the user device 110 collects audio not only within the bandwidth expected for the ATM 120, but also outside that bandwidth.

The profile server 140, in communication with device 110, builds a profile of the user based on the collected audio signals—Block 240. In the continuing example, the data collected by the user device 120 is communicated to the profile server 140 over communication network 99. The audio profile is built by the profile server 140 from data collected by the user device 110 when pairing with the particular given automatic teller machine 120 among a bank of two ATMS serves as part of the profile developed by the profile server 140. That profile includes broadcast audio of the other ATM and background sounds. Such a profile can be treated as unique to the setting. In some embodiments, the profile server 140 builds the risk profile based no only on the collected signals, but on one or more of the frequency of pairings between the user device and the target device, the rate of transactions completed after pairing between the user device and the target device, and the time of the pairing initiation.

The access control server 130 controls the user's access based on the developed profile—Block 250. The user's access can be to network resources (such as devices or data), specific functions of network resources (such as account functions), or to other resources (such as access to restricted physical spaces). In the continuing example, the profile gathered at the particular ATM can be used by the access control server 130 to control the degree of authentication required over communication network 99. For example, the user may not be required to provide a PIN for the user's regular Friday ATM withdrawal from the particular ATM if an audio environment sufficiently corresponding to the profile is found. In another example, where the bank of ATMs are associated with a record of fraudulent activity, sensing an audio environment sufficiently corresponding to the profile triggers additional authorization steps imposed by the access control server 130.

Figure 3:
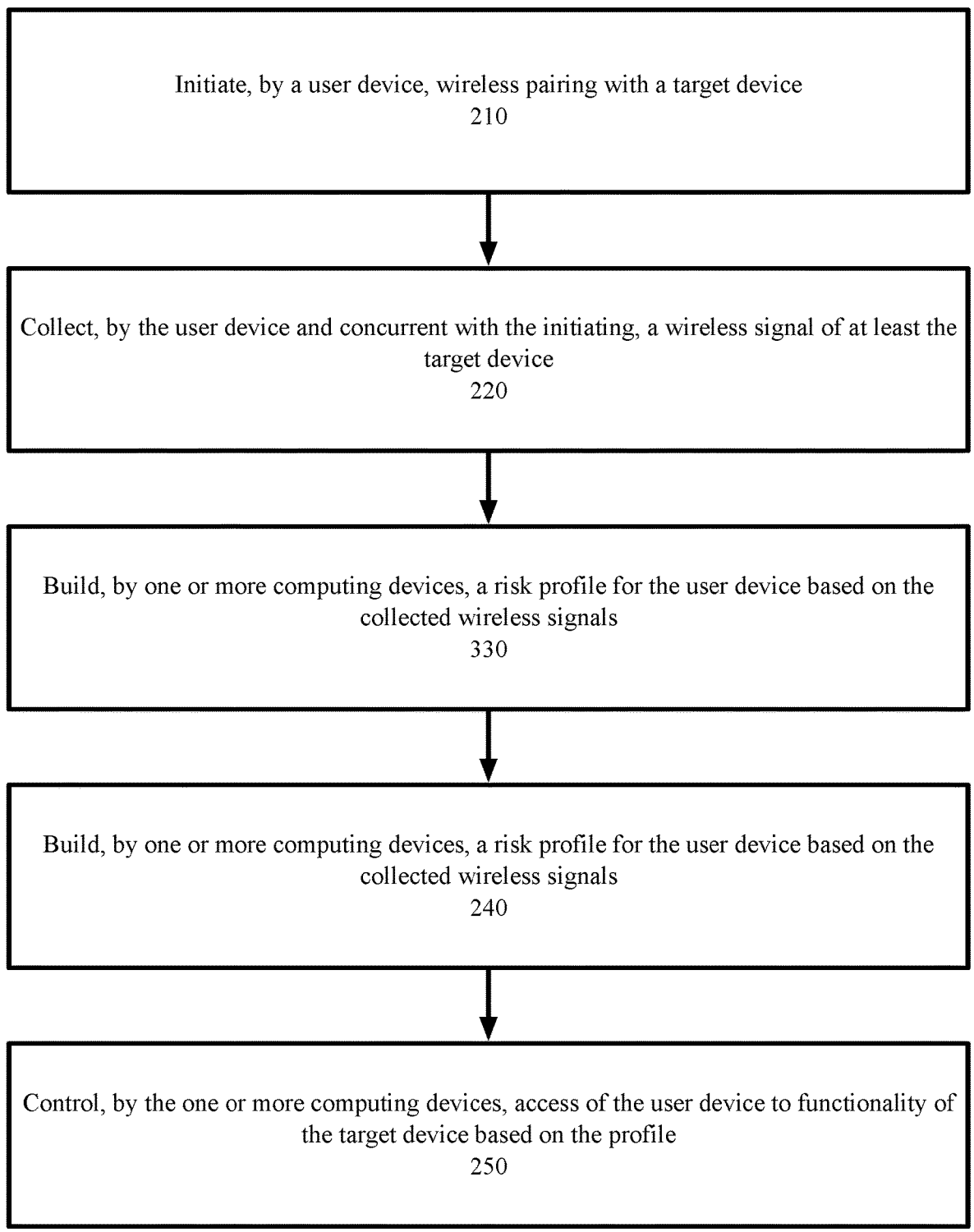
FIG. 3 is a block diagram illustrating methods to control wireless access to target devices, in accordance with certain example embodiments.

Referring to FIG. 3, and continuing to refer to prior figures for context, methods 300 to identify user devices using audio signals are illustrated in accordance with certain example embodiments.

In such methods 300, concurrent with initiating pairing with the target device 120, the user device determines the location of the user device—Block 330. In the continuing example, the user device 110 is equipped with a global positioning system (GPS) chip that locates the user device. The user device 110 communicates the collected location data to the profile server 140 via communication network 99. The location information is then used along with the other profile information by the profile server 140 to build the profile (as described in connection with Block 340) that is relied on by the access control server 130 to control access (as described in connection with Block 350).

Other Example Embodiments

FIG. 4 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

In the following some examples are described.

Example 1: A computer-implemented method to control wireless access to target devices, includes initiating, by a user device, wireless pairing with a target device. The user device collects, concurrent with the initiating, a wireless signal of at least the target device. One or more computing devices build a profile for the user device based on the collected wireless signals. The one or more computing devices control access of the user device to functionality of the target device based on the profile.

Example 2: The method of example 1, wherein the collected signal of a least the target device is an audio frequency signal.

Example 3: The method of example 1 or 2, wherein collecting further comprises collecting, by the user device and concurrent with the initiating, audio outside the bandwidth of the wireless signal of the target device.

Example 4: The method of at least one of the preceding examples, wherein collecting comprises collecting a plurality of signals in the frequency band of the wireless signal of the target device.

Example 5: The method of at least one of the preceding examples, further comprising determining, by the user device and concurrent with the initiating, the location of the user device, and wherein the profile is built further based in the determined location.

Example 6: The method of at least one of the preceding examples, wherein controlling access comprises basing a level of authentication required from the user device on the profile.

Example 7: The method of at least one of the preceding examples, wherein the profile is built further based on one or more of the frequency of pairings between the user device and the target device, the rate of transactions completed after pairing between the user device and the target device, and the time of the pairing initiation.

Example 8: The method of at least one of the preceding examples, wherein the target device comprises an automatic teller machine or an information kiosk.

Example 9: The method of at least one of the preceding examples, wherein the user device is a smartphone.

Example 10: The method of at least one of the preceding examples, wherein the profile server builds the risk profile based collected signals, frequency of pairings between the user device and the target device, the rate of transactions completed after pairing between the user device and the target device, and/or the time of the pairing initiation.

Example 11: A computer program product, comprising at least one non-transitory computer-readable storage device having computer-executable program instructions embodied thereon that when executed by one or more computers cause the computers to control wireless access to target devices. The computer-executable program instructions comprise: computer-executable program instructions to initiate, by a user device, wireless pairing with a target device; computer-executable program instructions to collect, by the user device and concurrent with the initiating, a wireless signal of at least the target device; computer-executable program instructions to build, by one or more computing devices, a profile for the user device based on the collected wireless signals; and computer-executable program instructions to control, by the one or more computing devices, access of the user device to functionality of the target device based on the profile.

Example 12: The computer program product of example 11, wherein the collected signal of a least the target device is an audio frequency signal.

Example 13: The computer program product of example 11 or 12, wherein collecting further comprises collecting, by the user device and concurrent with the initiating, audio outside the bandwidth of the wireless signal of the target device.

Example 14: The computer program product of at least one of the examples 11 to 13, wherein the collecting comprises collecting a plurality of signals in the frequency band of the wireless signal of the target device.

Example 15: The computer program product of at least one of the examples 11 to 14, further comprising determining, by the user device and concurrent with the initiating, the location of the user device, and wherein the profile is built further based in the determined location.

Example 16: The computer program product of at least of the examples 11 to 15 wherein controlling access comprises basing a level of authentication required from the user device on the profile.

Example 17: The computer program product of at least one of the examples 11 to 16, wherein the profile is built further based on one or more of the frequency of pairings between the user device and the target device, the rate of transactions completed after pairing between the user device and the target device, and the time of the pairing initiation.

Example 18: The computer program product of at least one of the examples 11 to 17, wherein the target device comprises an automatic teller machine or an information kiosk.

Example 19: The computer program product of at least one of the examples 11 to 18, wherein the user device is a smartphone.

Example 20: The method of at least one of the examples 11 to 19, wherein the profile server builds the risk profile based collected signals, frequency of pairings between the user device and the target device, the rate of transactions completed after pairing between the user device and the target device, and/or the time of the pairing initiation.

Example 21: A system to control wireless access to target devices, the system comprising: a storage device; and a processor communicatively coupled to the storage device, wherein the processor executes application code instructions that are stored in the storage device to cause the system to: initiate, by a user device, wireless pairing with a target device; collect, by the user device and concurrent with the initiating, a wireless signal of at least the target device; build, by one or more computing devices, a profile for the user device based on the collected wireless signals; and control, by the one or more computing devices, access of the user device to functionality of the target device based on the profile.

Example 22: The system of example 21, wherein the collected signal of a least the target device is an audio frequency signal.

Example 23: The system of example 21 or 22, wherein collecting further comprises collecting, by the user device and concurrent with the initiating, audio outside the bandwidth of the wireless signal of the target device.

Example 24: The system of at least one of the examples 21 to 23, wherein collecting comprises collecting a plurality of signals in the frequency band of the wireless signal of the target device.

Example 25: The system of at least one of the examples 21 to 24 wherein the processor further executes application code instructions that are stored in the storage device to cause the system to determine, by the user device and concurrent with the initiating, the location of the user device, and wherein the profile is built further based in the determined location.

Example 26: The system at least one of the examples 21 to 26 wherein the profile is built further based on one or more of the frequency of pairings between the user device and the target device, the rate of transactions completed after pairing between the user device and the target device, and the time of the pairing initiation.

Example 26: The system of at least one of the examples 21 to 26, wherein the target device comprises an automatic teller machine or an information kiosk.

Example 27: The system of at least one of the examples 21 to 26, wherein the user device is a smartphone.

Example 28: The system of at least one of the examples 21 to 27, wherein the profile server builds the risk profile based collected signals, frequency of pairings between the user device and the target device, the rate of transactions completed after pairing between the user device and the target device, and/or the time of the pairing initiation.

The invention claimed is:

1. A computer-implemented method to control wireless access to target devices, comprising:
receiving, by one or more computing devices from a user device, a request to initiate wireless pairing between the user device and a target device;
receiving, by the one or more computing devices from the user device, a wireless signal of at least the target device collected by the user device, wherein the wireless signal includes audio outside a bandwidth of the wireless signal of the target device collected by the user device;
building, by the one or more computing devices, a risk profile for the user device based on the collected wireless signals, the collected wireless signals of a least the target device is an audio frequency signal and wherein the risk profile is associated with a potential for fraudulent activity indicated by one or more factors in the collected wireless signals, wherein the risk profile includes wireless signal data of at least one device other than the target device; and
controlling, by the one or more computing devices, access of the user device to functionality of the target device based on the risk profile.

2. The method of claim 1, wherein receiving, by the one or more computing devices from the user device, a wireless signal of at least the target device collected by the user device further comprises receiving, by the one or more computing devices, a plurality of signals in a frequency band of the wireless signal of the target device.

3. The method of claim 1:
further comprising receiving, by the one or more computing devices from the user device, a determined location of the user device, and wherein the risk profile is built further based in the determined location.

4. The method of claim 1, wherein controlling access comprises basing a level of authentication required from the user device on the risk profile.

5. The method of claim 1, wherein the risk profile is built further based on one or more of a frequency of pairings between the user device and the target device, a rate of transactions completed after pairing between the user device and the target device, and a time of the pairing initiation.

6. The method of claim 1, wherein the target device comprises an automatic teller machine or an information kiosk.

7. The method of claim 1, wherein the user device is a smartphone.

8. The method of claim 1, wherein a profile server builds the risk profile based on collected signals, a frequency of pairings between the user device and the target device, a rate of transactions completed after pairing between the user device and the target device, and/or a time of the pairing initiation.

9. A non-transitory computer-readable medium storing instructions that, when executed by one or more computing devices, cause the one or more computing devices to perform operations, the operations comprising:
receiving, from a user device, a request to initiate wireless pairing between the user device and a target device;
receiving, from the user device, a wireless signal of at least the target device collected by the user device, wherein the wireless signal includes audio outside a bandwidth of the wireless signal of the target device collected by the user device;
build a risk profile for the user device based on the collected wireless signals, the collected wireless signals of a least the target device is an audio frequency signal and wherein the risk profile is associated with a potential for fraudulent activity indicated by one or more factors in the collected wireless signals, wherein the risk profile includes wireless signal data of at least one device other than the target device; and
control access of the user device to functionality of the target device based on the risk profile.

10. The non-transitory computer-readable medium of claim 9, wherein the operations for receiving, from the user device, a wireless signal of at least the target device collected by the user device further comprise operations for receiving, from the user device, a plurality of signals in a frequency band of the wireless signal of the target device.

11. The non-transitory computer-readable medium of claim 9:
further comprising operations for receiving, from the user device, a determined location of the user device, and wherein the profile is built further based on the determined location.

12. The non-transitory computer-readable medium of claim 9, wherein the risk profile is built further based on one or more of a frequency of pairings between the user device and the target device, a rate of transactions completed after pairing between the user device and the target device, and a time of the pairing initiation.

13. The non-transitory computer-readable medium of claim 9, wherein the target device comprises an automatic teller machine or an information kiosk, wherein the user device comprises a smartphone.

14. The non-transitory computer-readable medium of claim 9, wherein a profile server builds the risk profile based on collected signals, frequency of pairings between the user device and the target device, a rate of transactions completed after pairing between the user device and the target device, and/or a time of the pairing initiation.

15. A system to control wireless access to target devices, the system comprising:
a storage device; and
a processor communicatively coupled to the storage device, wherein the processor executes application code instructions that are stored in the storage device to cause the system to:
receive, from a user device, a request to initiate a wireless pairing with a target device;
receiving, from the user device, a wireless signal of at least the target device collected by the user device, wherein the wireless signal includes audio outside a bandwidth of the wireless signal of the target device collected by the user device;
build, by one or more computing devices, a risk profile for the user device based on the collected wireless signals, wherein the risk profile is associated with a potential for fraudulent activity indicated by one or more factors in the collected wireless signals, wherein the risk profile includes wireless signal data of at least one device other than the target device; and
control, by the one or more computing devices, access of the user device to functionality of the target device based on the risk profile.

16. The system of claim 15, wherein the collected signal of at least the target device is an audio frequency signal.

17. The system of claim 15, wherein the profile is built further based on one or more of a frequency of pairings between the user device and the target device, a rate of transactions completed after pairing between the user device and the target device, and a time of the pairing initiation.

* * * * *